United States Patent [19]

Kimura et al.

[11] Patent Number: 4,893,658

[45] Date of Patent: Jan. 16, 1990

[54] FRP PIPE WITH THREADED ENDS

[75] Inventors: Kunitoshi Kimura, Osaka; Tetsuzo Arai, Takarazuka; Hiroshi Matsuoka, Tsu; Toshiharu Nakagawa, Suzuka, all of Japan

[73] Assignees: Sumitomo Metal Industries, Ltd.; Nitto Electric Industrial Company, Ltd., both of Osaka, Japan

[21] Appl. No.: 199,923

[22] Filed: May 26, 1988

[30] Foreign Application Priority Data

May 27, 1987 [JP] Japan .................. 62-130586

[51] Int. Cl.⁴ .............................. F16L 9/14
[52] U.S. Cl. ..................... 138/109; 204/14.1; 204/20; 204/40; 285/288; 285/333
[58] Field of Search ............ 138/109, DIG. 6, 174, 138/144, 145, 146, 143, 155, 172, DIG. 2, DIG. 7; 285/55, 333, 334, 355, 45, 284, 288, 328, 919, 920; 166/242; 428/36; 204/41, 14.1, 20, 25, 26, 30

[56] References Cited

U.S. PATENT DOCUMENTS

| | | | |
|---|---|---|---|
| 3,661,670 | 5/1972 | Pierpont | 138/109 |
| 4,468,309 | 8/1984 | White | 204/192.31 |
| 4,474,651 | 10/1984 | Yauchi | 204/41 |
| 4,592,808 | 6/1986 | Doubt | 204/20 |
| 4,600,480 | 7/1986 | Coombes et al. | 204/41 |
| 4,630,849 | 11/1986 | Fukui | 285/55 |

FOREIGN PATENT DOCUMENTS 0264446  2/1986  European Pat. Off. .

OTHER PUBLICATIONS

Lowenheim, Frederick A.; *Electroplating*, Sponsored by the American Electroplaters' Society; pp. 416–425.
World Oil's 1986 Tubing Tables, Gulf Publishing Co.
Fibercast: Pipe and Tubing; Engineering Data and Other Information: Bulletin #20; copyright 1958.

*Primary Examiner*—Henry J. Recla
*Assistant Examiner*—Glenn T. Barrett
*Attorney, Agent, or Firm*—Burns, Doane, Swecker & Mathis

[57] ABSTRACT

An FRP pipe having threaded ends at both ends, such as casing, tubing, and coupling, is disclosed, which is characterized in that metal plating is formed on the surface of at least one of the threaded ends.

20 Claims, 1 Drawing Sheet

U.S. Patent  Jan. 16, 1990  4,893,658
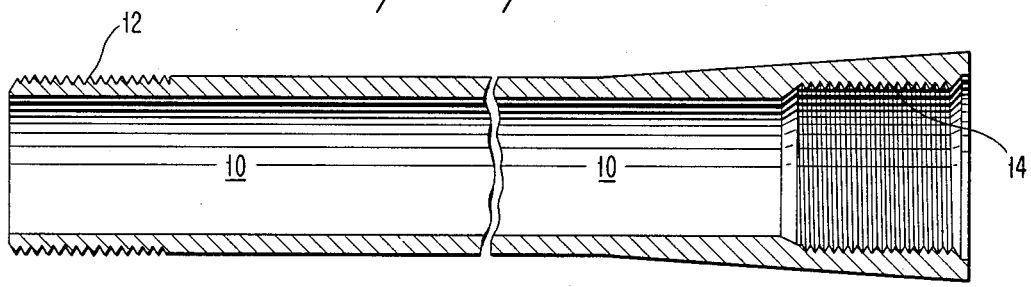
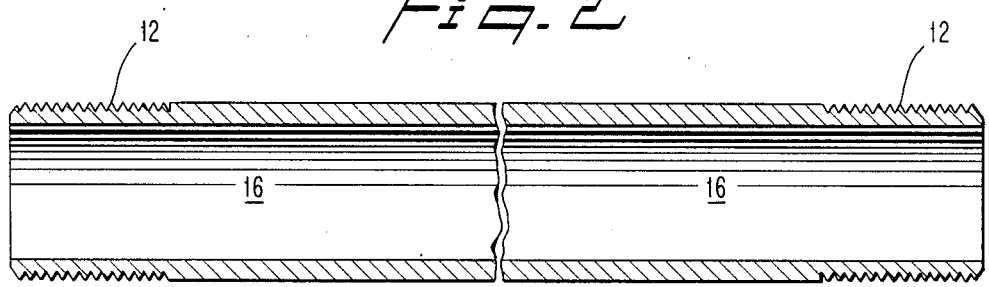

FRP PIPE WITH THREADED ENDS

BACKGROUND OF THE INVENTION

This invention relates to an FRP pipe having threaded ends at both ends, and in particular it relates to an FRP pipe with threaded ends which is suitable as casing and tubing for use in oil and gas wells.

Oil well casing or tubing for use in crude oil and natural gas wells are generally made of steel. However, in recent years, the environments of oil wells have become more severe ones which contain many corrosive materials such as $CO_2$, $H_2S$, and $Cl^-$. In addition, as crude oil resources decrease, the recovery method has become very popular in which $CO_2$ and salt water are injected into a well. Under these conditions, the corrosion resistance of conventional carbon steel pipes has been found to be inadequate, and several ways to prevent corrosion are now commonly being taken, such as the use of inner surface coatings or corrosion-resistant steels containing large quantities of chromium, nickel, and the like.

However, inner surface coatings suffer from problems like the generation of pin holes on the end surfaces of pipes and damage to the coating during wire line operations, and as a result they are not very effective at increasing the life span of pipes in actual use. Corrosion-resistant steel pipes, on the other hand, contain large quantities of expensive alloying elements such as chromium and nickel, so the cost of these pipes is high.

In light of these circumstances, there is considerable interest in the use of fiberglass reinforced plastic (FRP) pipes, which are less expensive than the above-described corrosion-resistant steel pipes and have excellent corrosion resistance in the environments of oil wells. In the United States, the American Petroleum Institute (API) has already created specifications for FRP pipes for use in oil wells, and FRP pipes are beginning to be used in the oil field.

Oil well pipes are normally used for a certain period of time at one well, after which they are disassembled and reused at another well. Therefore, oil well pipes generally have threaded ends by means of which they can be joined to one another. This also is the case for FRP oil well pipes, which are equipped with threaded ends.

As is the case with steel oil well pipes, in order to increase the seal-tightness of the connections between FRP pipes, a lubricant is applied between the male and the female threads when joining them to one another. The lubricant is referred to as a "thread compound" and is a mixture of grease (mineral oil) and a solid lubricant such as graphite, $MoS_2$, Pb, Cu, and Zr. After a period of use, however, the lubricant which was applied to the joint hardens and bonds to the thread surfaces because of the high-temperature environment in which oil well pipes are used. When the lubricant hardens and bonds to the FRP threads, it becomes difficult to separate the pipes from one another. Therefore, when disassembling the pipes, very high torque values may be applied in such case, which may damage the threads of the pipes, and in some cases may even break the pipes themselves.

SUMMARY OF THE INVENTION

The object of this invention is to provide FRP pipes with threaded ends which can be easily disconnected from one another even after being connected to one another during actual use with a thread compound applied to the threaded ends.

The present inventors conducted various tests and investigations aimed at finding a means of preventing a thread compound from bonding to thread surfaces. As a result, it was found that if a metal is plated on the thread surfaces of an FRP pipe, a thread compound can be effectively prevented from bonding to the thread surfaces during high-temperature use, and pipes with threaded ends can be disconnected without the application of excess force.

This invention is based on the above discovery, and it resides in an FRP pipe having threaded ends at both ends, characterized in that metal plating is formed on the thread surface of at least one of the threaded ends.

More specifically, this invention resides in an FRP pipe having threaded ends, the pipe having a male thread and a female thread at opposite ends, characterized in that metal plating is formed on the thread surface of at least one of the male thread and the female thread.

Thus, according to this invention, the FRP pipe includes not only casing, tubing, etc. but also a coupling which connects such piping.

It is already known to apply metal plating to the thread surface of steel pipe casing or tubing for use in oil wells, but the purpose thereof is to prevent galling. However, according to this invention, the metal plating is carried out so as to prevent a thread compound from bonding to the thread surface.

Thus, in another aspect, the present invention is a method of preventing the thread compound from bonding to the thread surface for an FRP pipe having threaded ends at both ends, characterized by forming metal plating on the surface of at least one of the threaded ends.

BRIEF DESCRIPTION OF THE DRAWINGS

FIG. 1 is a cross-sectional view showing the shape of an example of an FRP pipe with a threaded end; and FIG. 2 is a cross-sectional view showing the shape of an example of an FRP coupling having male threads at both ends.

DESCRIPTION OF THE PREFERRED EMBODIMENTS

FIG. 1 diagrammatically shows an FRP pipe 10 with threaded ends having a male thread 12 and a female thread 14 at its ends. FIG. 2 shows an example of a coupling 16 having male threads 12 at both ends.

The structure of FRP pipe is well known in the art, and further explanation thereof will be omitted for clarification.

According to the present invention metal plating is applied to the threaded surface of at least one of the thread surfaces, i.e., the male thread 12 and female thread 14 in this case.

The plating which is applied to the thread surface can comprise either a single layer or plurality of layers. Examples of metals which can be used for the plating are copper, nickel, chromium, aluminum, zinc, and tin. As will be described hereinafter, these metals can be easily applied to an FRP surface by electroless plating or electroplating. Both plating methods are extremely effective at preventing a thread compound from hardening, and can fully satisfy the objects of the invention.

The plating layer can provide the desired effects if applied to either the male or the female threads, but it can of course be applied to both.

There is no particular limit on the thickness of the plating layer, but from the standpoint of effectiveness, it is preferable for the thickness to be at least 0.5 microns. Theoretically, there is no upper limit on the plating thickness, but an excessively large plating thickness provides no added benefits and is disadvantageous from the standpoints of the additional time and cost required to manufacture it. Furthermore, as the plating thickness increases, residual stresses become higher and adhesion to the substrate decreases. Therefore, the plating thickness is preferably at most 40 microns.

The plating layer can be formed by either electroless plating or a combination of electroless plating and electroplating. Whichever method is used, it is desirable to perform pretreatment consisting of degreasing the surface of the FRP pipe to be plated (the threaded portion), washing it, and then subjecting it to acid etching in order to form fine irregularities in the surface. After acid etching, palladium or the like is adsorbed and deposited onto the surface. The palladium serves as a catalyst in the redox reaction taking place during electroless plating.

Electroless plating is generally copper plating or nickel plating. Electroless plating requires more time than electroplating, and the formation of a thick plating is extremely time-consuming, resulting in an increase in costs. However, a metal plating having a thickness of as low as 0.5 microns is effective for the purpose of the present invention, and as forming a plating of this thickness does not require much time even with electroless plating, there are no cost drawbacks to employing electroless plating in the present invention.

As mentioned above, electroplating is more rapid than electroless plating and is cost effective when forming a relatively thick plating layer. However, when performing electroplating on an FRP pipe, prior to electroplating, it is necessary to first perform electroless plating. This is of course because FRP is an electrical insulator, and electroplating can not be performed thereon unless an electrically conductive layer is first formed on the surface by electroless plating. The conducting layer of plating which is applied by electroless plating is generally copper plating or nickel plating. If the surface of the FRP pipe is first made electrically conductive in this manner, any type of electroplating can then be performed thereon.

There is no particular restriction on the shape of the threads, but round threads which meet API specifications (API Grade EUE, 8-round threads (8 threads per inch) on external-upset pipe), buttress threads, and the like are most common.

There is also no restriction on the manner of forming the threads. For example, the female threads can be formed using the mandrel having the male threads at the same time that the pipe is formed by the filament winding method, and the male threads can be formed by cutting on a lathe or by grinding using a grinding stone.

Oil well pipe comes in various sizes. Tubing has an outer diameter of 1⅜"–4½", casing has an outer diameter of 5½"–10¾", and both come in lengths up to 30 feet (9144 mm).

Some working examples of the present invention will be described in conjunction with comparative examples. These examples are merely illustrative and not in any way restrictive to the present invention.

EXAMPLES 1-3

FRP pipes with threaded ends having the shape and dimensions shown in FIG. 1 were manufactured using the materials described below. The pipe was formed by the filament winding method, and the female threads were formed at the same time as the pipe using the mandrel mold for the male threads. The male threads were formed by grinding with a grinding stone.

*PIPE MATERIALS (1) Resin: An epoxy resin (Epikote 828 manufactured by Yuka-Shell Epoxy Co., Ltd.) was used as the main component, and an acid anhydride (HN-2200 manufactured by Hitachi Chemical Co., Ltd.) was used as a curing agent. These were mixed in a weight ratio of 100:80.

(2) Fibers: Glass roving (Glasslon R-1150 manufactured by Asahi Fiberglass Co.)

(3) Threaded ends: 8-round threads (8 threads per inch) conforming to API specifications.

Metal plating was then formed on the male threads of the resulting FRP pipe to obtain the following three different types.

EXAMPLE 1

| | | |
|---|---|---|
| (1) | Plating composition | 2 layers (inner layer: approximately 0.3 microns thick, outer layer: approximately 15 microns thick) |
| (2) | Plating metal | inner layer - nickel outer layer - copper |
| (3) | Plating method | inner layer - electroless plating outer layer - electroplating |
| (4) | Treatment procedure | See Table 1. |

EXAMPLE 2

| | | |
|---|---|---|
| (1) | Plating composition | one layer (approximately 2 microns thick |
| (2) | Plating metal | nickel |
| (3) | Plating method | electroless plating |
| (4) | Treatment procedure | Pretreatment - same as Example 1 (see Table 1) Plating conditions - Plating time was 60 minutes. Conditions were otherwise the same as for electroless plating process shown in Table 2. |

EXAMPLE 3

| | | |
|---|---|---|
| (1) | Plating composition | three layers (inner layer - approximately 0.3 microns thick, middle layer - approximately 3 microns thick, outer layer - approximately 2 microns thick). |
| (2) | Plating metal | inner layer - nickel middle layer - copper outer layer - chromium |
| (3) | Plating method | inner layer - electroless plating middle and outer layers - electroplating |
| (4) | Treatment procedure | Pretreatment - same as for Example 1 (see Table 1). Plating conditions - Inner layer - same as electroless |

-continued plating method for Example 1
(Table 1)
Middle layer - Plating time -
5 minutes, otherwise the same as
electroplating conditions shown in
Table 2,
Outer layer - bath temperature
60° C., current density 27A/dm², 
chromium electroplating for 8
minutes.

In order to investigate the ability to prevent a thread compound from bonding to the threaded ends, the above-described three examples of the present invention and an unplated conventional example were subjected to the following test.

**\*THREAD TIGHTENING AND UNTIGHTENING TEST**

The male and female threads were cut off a pipe to be tested, and then a thread compound (L.O.R. #105 manufactured by O.C.R. of the United States) was coated on the thread surfaces. The threaded portions were then screwed together to form a joint using a torque of 240 foot-pounds (approximately 33 kg-m) in accordance with API specifications. Next, a 5-ton tensile load was applied in the axial direction, and the joint was maintained in this state at 200° F. (approximately 93° C.) in a constant temperature bath for three months. At the end of this period, the torque required to unscrew the male and female portions of the joint was measured.

The results are shown in Table 2. The condition of the threaded portions is also shown in the table.

Compared to the Conventional Example without plating, the torque to untighten the joints for Examples 1–3 of the present invention was very small. Furthermore, the threaded portions of the Comparative Example suffered from breakage and deformation after disconnection, but no such damage was observed with the present invention.

As is clear from the preceding explanation, as an FRP pipe with threaded ends in accordance with the present invention has a metal plating applied to the thread surfaces of the threaded ends, even if a thread compound is applied to the threaded ends and the thread compound hardens due to high-temperature use, the threaded ends can be easily disconnected from one another without the use of an excessive torque, and there is no danger of damaging either the threaded ends or the pipe itself. Accordingly, the present invention is extremely suitable for oil well pipes used in the exploitation of crude oil and natural gas which after one use are disconnected and reused.

While the invention has been described with reference to the foregoing embodiments, various changes and modifications may be made thereto which fall within the scope of the appended claims.

TABLE 1

| Treatment Stage | Treatment Procedure | Treatment Conditions | | |
|---|---|---|---|---|
| | | Bath Conditions | Bath Temp. | Treatment Time |
| PRE-TREATMENT | Degreasing | Alkali bath | 50° C. | 5 minutes |
| | Washing | | | |
| | Etching I | Chromic acid-sulfuric acid bath | 65° C. | 5 minutes |
| | Washing | | | |
| | Etching II | (NaOH 200 g/l) (Additive 200 ml/l) | 65° C. | 20 minutes |
| | Washing | | | |
| | Neutralization | Hydrochloric acid 500 ml/l | Room temp. | 2 minutes |
| | Washing | | | |
| | Conditioner | | 40° C. | 5 minutes |
| | Washing | | | |
| | Catalyst | | Room temp. | 5 minutes |
| | Washing | | | |
| | Accelerator | Sulfuric acid 100 ml/l | 40° C. | 4 minutes |
| | Washing | | | |
| PLATING | Electroless Plating (nickel) | TMP Chemicals nickel bath | 40° C. | 8 minutes |
| | Washing | | | |
| | Acid activation | | Room temp. | 30 seconds |
| | Washing | | | |
| | Electroplating (copper) | Sulfuric acid bath | 23° C. | 15 minutes (current density: 3A/dm²) |

TABLE 2

| | | Condition of threads | |
|---|---|---|---|
| | Torque to Untighten | Male threads | Female thread |
| Present Invention | 1  350 ft-lb (48 kg-m) | No damage | No damage |
| | 2  300 ft-lb (41 kg-m) | No damage | No damage |
| | 3  270 ft-lb (37 kg-m) | No damage | No damage |
| Comparative Example | 2500 ft-lb (346 kg-m) | Much breakage, partial deformation | Male threads remained, partial deformation |

We claim:

1. An oil well FRP pipe having threaded surfaces at both ends thereof, the pipe including means comprising a metal plating formed on the surface of at least one of the threaded ends for preventing bonding of thread compound thereto.

2. An FRP pipe as defined in claim 1, wherein it has a male thread and a female thread at its ends, and metal plating is formed on the thread surface of at least one of the male thread and the female thread.

3. An FRP pipe with threaded ends as defined in claim 1, wherein the metal plating layer on the thread surface comprises one or more layers, and each layer is made of one or more of copper, nickel, aluminum, chromium, zinc, and tin.

4. An FRP pipe with threaded ends as defined in claim 1, wherein the pipe constitutes casing used in oil wells.

5. An FRP pipe with threaded ends as defined in claim 1, wherein the pipe constitutes tubing used in oil wells.

6. An FRP pipe as defined in claim 1, wherein the pipe is a coupling having male threads at both ends, and metal plating is formed on the thread surface of at least one of the male threads.

7. The FRP pipe of claim 1, wherein the metal plating comprises a plurality of layers of different metals, a first one of the layers containing Ni and a second one of the layers containing Cu.

8. The FRP pipe of claim 1, wherein the FRP pipe comprises part of an oil well FRP pipe joint.

9. A method of preventing a thread compound from bonding to the thread surface of an FRP pipe having threaded surfaces at opposite ends thereof, comprising the step of applying metal plating on the surface of at least one of the threaded ends.

10. The method of claim 9, wherein the FRP pipe includes a male thread at one end and a female thread at an opposite end, and metal plating being formed on the thread surface of at least one of the male thread and the female thread.

11. The method of claim 9, wherein the metal plating is applied in at least one layer on the thread surface, the metal plating of each layer being selected from at least one member of the group consisting of copper, nickel, aluminum, chromium, zinc, and tin.

12. The method of claim 9, wherein the pipe constitutes casing used in oil wells.

13. The method of claim 9, wherein the pipe is a coupling having male threads at both ends, the metal plating being formed on the thread surface of at least one of the male threads.

14. The method of claim 9, wherein said metal plating step is performed by an initial electroless plating operation followed by an electroplating operation, the FRP pipe comprising part of an oil well FRP pipe joint.

15. The method of claim 14, wherein a thickness of the metal plating applied during the electroless plating operation is no greater than about $2\mu$ and a thickness of the metal plating applied during the electroplating operation is no greater than about $15\mu$.

16. The method of claim 14, wherein Ni is applied during the electroless plating operation and Cu is applied during the electroplating operation.

17. The method of claim 16, wherein the pipe constitutes tubing used in oil wells.

18. The method of claim 11, wherein two metal layers are applied by the electroplating operation, the two metal layers being Cu and Cr.

19. The method of claim 9, wherein the metal plating is applied such that a thickness thereof is at least about $0.5\mu$ and no greater than about $40\mu$.

20. The method of claim 19, wherein the thickness is no greater than about $2\mu$.

* * * * *